US010919390B2

(12) United States Patent
Moriizumi et al.

(10) Patent No.: US 10,919,390 B2
(45) Date of Patent: Feb. 16, 2021

(54) RESIN COMPONENT, AND MOLDING METHOD AND MOLDING DEVICE FOR SAME

(71) Applicant: HONDA MOTOR CO., LTD., Tokyo (JP)

(72) Inventors: Taiki Moriizumi, Tochigi (JP); Yuuki Kami, Tochigi (JP); Noboru Hirano, Tochigi (JP); Toshihiro Saimura, Tochigi (JP); Hajime Miyamoto, Tochigi (JP); Atsushi Yusa, Tochigi (JP); Kazuhiro Kawano, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/337,683

(22) PCT Filed: Sep. 20, 2017

(86) PCT No.: PCT/JP2017/033828
§ 371 (c)(1),
(2) Date: Mar. 28, 2019

(87) PCT Pub. No.: WO2018/061906
PCT Pub. Date: Apr. 5, 2018

(65) Prior Publication Data
US 2020/0031229 A1      Jan. 30, 2020

(30) Foreign Application Priority Data
Sep. 30, 2016   (JP) ................. 2016-195048

(51) Int. Cl.
*B29C 45/16*    (2006.01)
*B60K 37/00*    (2006.01)
(Continued)

(52) U.S. Cl.
CPC .......... *B60K 37/00* (2013.01); *B60R 21/2165* (2013.01); *B29C 37/0057* (2013.01);
(Continued)

(58) Field of Classification Search
CPC ....... B60K 37/00; B60R 21/215; B29C 45/00; B29C 45/16; B29C 45/1635; B29C 45/1639; B29C 45/164
See application file for complete search history.

(56) References Cited

U.S. PATENT DOCUMENTS 5,947,511 A * 9/1999 Usui ................. B29C 33/42
264/255
2003/0201570 A1* 10/2003 Sasatani ............. B29C 45/1615
264/250
(Continued)

FOREIGN PATENT DOCUMENTS

JP     04-334416     11/1992
JP     05-104575     4/1993
(Continued)

OTHER PUBLICATIONS

International Search Report, dated Oct. 31, 2017 (Oct. 31, 2017), 2 pages.

*Primary Examiner* — James A English
(74) *Attorney, Agent, or Firm* — Rankin, Hill & Clark LLP (57) ABSTRACT

An instrument panel (10) is formed by bonding a base material portion (20) composed of a base material M1 and a different material portion (30) composed of a different material M2. The different material portion (30) is infiltrated into the base material portion (20) and the infiltration portion (33) has a plurality of intermittent recessed portions.

7 Claims, 3 Drawing Sheets

(51) Int. Cl.
*B60R 21/2165* (2011.01)
*B29C 37/00* (2006.01)
*B29L 31/30* (2006.01)

(52) U.S. Cl.
CPC ...... *B29C 45/1639* (2013.01); *B29C 45/1657* (2013.01); *B29L 2031/3038* (2013.01)

(56) References Cited

U.S. PATENT DOCUMENTS

| | | | |
|---|---|---|---|
| 2009/0081407 A1* | 3/2009 | Giraud | B29C 37/0082 |
| | | | 428/98 |
| 2010/0013124 A1 | 1/2010 | Kong | |
| 2014/0110054 A1* | 4/2014 | Shigihara | B29C 66/91921 |
| | | | 156/309.9 |
| 2014/0239546 A1* | 8/2014 | Santoni | B29C 70/342 |
| | | | 264/265 |
| 2016/0144557 A1* | 5/2016 | Moriizumi | B29C 66/9512 |
| | | | 156/73.5 |

FOREIGN PATENT DOCUMENTS

| | | |
|---|---|---|
| JP | 05-208428 | 8/1993 |
| JP | 09-226413 | 9/1997 |
| JP | 11-048284 | 2/1999 |
| JP | 2004-001424 | 1/2004 |
| JP | 2009-535247 | 10/2009 |

\* cited by examiner

RESIN COMPONENT, AND MOLDING METHOD AND MOLDING DEVICE FOR SAME

TECHNICAL FIELD

The present invention relates to a resin component composed of a plurality of resin materials, and a molding method and a molding device for the same.

BACKGROUND ART

An airbag door has conventionally been formed separately from an instrument panel of a vehicle, fitted into an opening portion of the instrument panel, and attached to the instrument panel.

However, in recent years, for efficient installation work, there are cases where the instrument panel and the airbag door are integrally formed by injection molding (for example, see Patent Literature 1).

CITATION LIST

Patent Literature

Patent Literature 1: Japanese Patent Laid-Open No. 9-226413

SUMMARY OF INVENTION

Technical Problem

However, the resin materials of the instrument panel and the airbag door are selected according to their respective suitability, and thus the resin materials are different from each other. For this reason, the prior art disclosed in Patent Literature 1 and the like may not ensure sufficient bonding strength.

In view of the above points, it is an object of the present invention to provide a resin component, and a molding method and a molding device for the same which can improve the bonding strength.

Solution to Problem

A resin component of the present invention is a resin component formed by bonding a first resin portion composed of a first resin material and a second resin portion composed of a second resin material, wherein one of the first resin portion and the second resin portion is infiltrated into the other, and an infiltration portion has a plurality of intermittent recessed portions.

According to the resin component of the present invention, one of the first resin portion and the second resin portion is infiltrated into the other, and the infiltration portion has a plurality of intermittent recessed portions. Thus, the bonding area is larger than that without such a recessed portion, which can improve the bonding strength between the first resin portion and the second resin portion.

In the resin component of the present invention, it is preferable that the plurality of intermittent recessed portions are arranged in the infiltration portion along a direction orthogonal to an infiltration direction.

In this case, the case in which the infiltration portion extends in a direction orthogonal to the infiltration direction can also improve the bonding strength between the first resin portion and the second resin portion.

A molding method for a resin component of the present invention comprises supplying the first resin material to a first mold portion in which the first resin portion of the molded resin component is molded, and supplying the second resin material to a second mold portion in which the second resin portion of the molded resin component molded at a supply pressure different from a supply pressure of the first resin material, for a cavity having a plurality of projections disposed at a boundary portion between the first mold portion and the second mold portion.

According to the molding method for the resin component of the present invention, one of the first resin material and the second resin material, whichever has a larger supply pressure, is infiltrated into the other through a gap of the plurality of projections disposed in the cavity. The infiltration degree is different depending on the portion. Thus, in the resin component which is a molded product, one of the first resin portion and the second resin portion is infiltrated into the other, and the infiltration portion has a plurality of recessed portions, which can improve the bonding strength between the first resin portion and the second resin portion.

A molding device of a resin component of the present invention is a molding device of a resin component formed by bonding a first resin portion composed of a first resin material and a second resin portion composed of a second resin material, the molding device comprising: a cavity having a plurality of projections disposed at a boundary portion between a first mold portion in which the first resin portion of the molded resin component is molded and a second mold portion in which the second resin portion of the molded resin component is molded; a first supply nozzle which supplies the first mold portion with the first resin material; a second supply nozzle which supplies the second mold portion with the second resin material; and a control unit which supplies the second resin material at a supply pressure different from a supply pressure of the first resin material.

According to the molding device of the resin component of the present invention, one of the first resin material and the second resin material, whichever has a larger supply pressure, is infiltrated into the other through a gap of the plurality of projections disposed in the cavity. The infiltration degree is different depending on the portion. Thus, in the resin component which is a molded product, one of the first resin portion and the second resin portion is infiltrated into the other, and the infiltration portion has a plurality of recessed portions, which can improve the bonding strength between the first resin portion and the second resin portion.

DESCRIPTION OF EMBODIMENTS

An instrument panel 10 according to an embodiment of a resin component of the present invention will be described.

Figure 1:
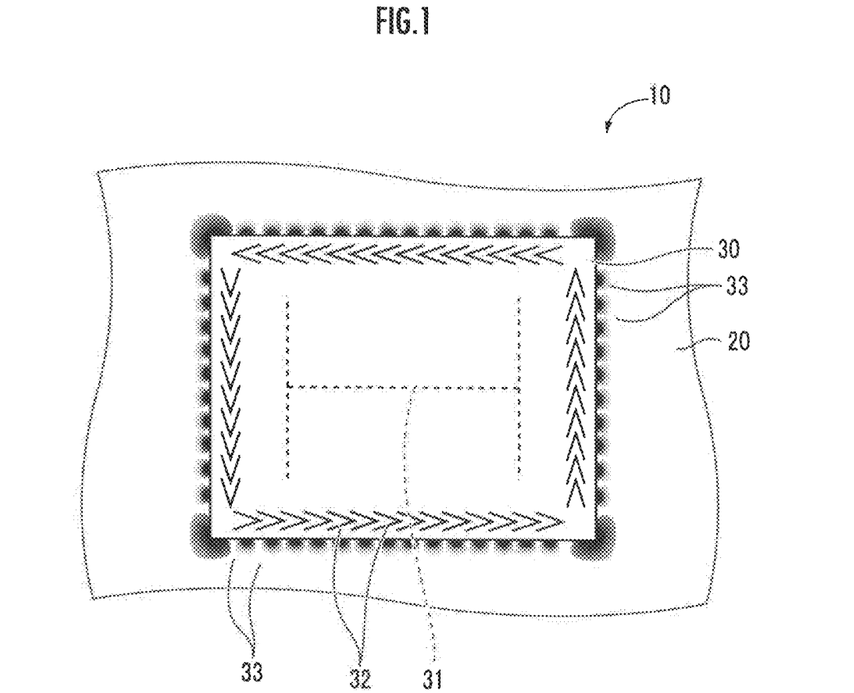
FIG. 1 is a partial schematic top view of an instrument panel according to an embodiment of the present invention.

As illustrated in FIG. 1, the instrument panel 10 of a vehicle comprises: a base material portion 20 which is made of a base material M1 corresponding to a first resin material of the present invention and which corresponds to a first resin portion of the present invention; and a different material portion 30 which is made of a different material M2 different from the base material M1, the material M2 corresponding to a second resin material of the present invention, and which corresponds to a second resin portion of the present invention. Although not illustrated, a skin, a meter visor, a decorative sheet, and the like are attached to the instrument panel 10.

The base material portion 20 constitutes the main body of the instrument panel 10. The base material portion 20 is formed of the base material M1, which is a resin material usually used in the instrument panel, herein, Polypropylene (PP). The base material portion 20 has an opening formed therein.

The different material portion 30 constitutes a door (also called a lid, hereinafter referred to as an airbag door) for an air bag device for an unillustrated passenger seat. The different material portion 30 is formed of the different material M2, which is a resin material usually used in the airbag door, herein, Thermoplastic Olefin Elastomer (TPO). In the present embodiment, the thermal shrinkage ratio of the different material M2 is greater than the thermal shrinkage ratio of the base material M1.

The different material portion 30 has a fragile portion 31 which is easily broken when the bag body of the air bag device is deployed. The fragile portion 31 is, for example, an H-shaped tear line formed thinner than the other portions.

The base material portion 20 is bonded to the different material portion 30 such that the base material portion 20 surrounds the different material portion 30 over the entire circumference. Specifically, the different material portion 30 is disposed in an opening so as to cover the opening formed in the base material portion 20.

Figure 2:
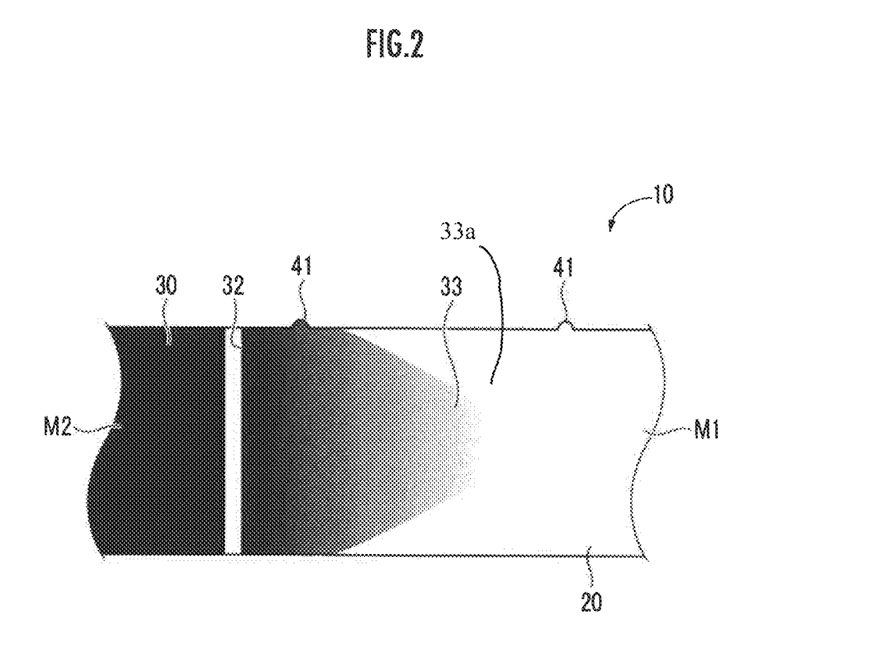
FIG. 2 is a schematic cross sectional view of the instrument panel.

As illustrated in FIG. 2, the base material portion 20 and the different material portion 30 are formed such that the base material M1 and the different material M2 overlap each other in a thickness direction (vertical direction) of the instrument panel 10 at a boundary portion therebetween. Specifically, at the boundary portion between the base material portion 20 and the different material portion 30, the different material M2 is infiltrated into the base material portion 20 from the different material portion 30, mixed with the base material M1, and protrudes to form an infiltration portion 33. This infiltration portion 33 firmly bonds the base material portion 20 and the different material portion 30. A plurality of infiltration portions 33 are intermittently arranged along an orthogonal direction to the infiltrated direction (left and right direction in the infiltration portion 33 at the right side and the left side of FIG. 1, up and down direction in the infiltration portion 33 at the up side and the down side of FIG. 1), and each of the plurality of infiltration portions 33 has a recessed portion 33a.

In FIG. 2, the base material M1 is illustrated in white and the different material M2 is illustrated in black. The infiltration portion 33 where white and black are mixed is schematically illustrated with a density corresponding to the ratio of the different material M2. Note that the shape of the infiltration portion 33 and the mixing state of the different material M2 illustrated in FIG. 2 are just an example of a schematic illustration.

Further, as illustrated in FIG. 1, the infiltration portion 33 is formed such that the base material M1 and the different material M2 are mixed also in a direction (horizontal direction) orthogonal to the thickness direction of the instrument panel 10.

Specifically, the infiltration portion 33 is formed such that the different material M2 is mixed with the base material M1 and extents so as to be infiltrated into the base material portion 20 from the different material portion 30. The margin of the infiltration portion 33 where the different material M2 is infiltrated into the base material M1 is broken at many places to form a so-called a petal shape. Thus, the infiltration portion 33 has a plurality of intermittent recessed portions 33a. These recessed portions 33a further firmly bond the base material portion 20 and the different material portion 30.

Each of the infiltration portions 33 forms so-called a large substantially conical shape or an enlarged shape of this in combination with the above described infiltration of the different material M2 into the base material M1 in the thickness direction of the instrument panel 10.

In FIG. 1, the infiltration portion 33 where the different material M2 is infiltrated into the base material M1 is schematically illustrated with a density corresponding to the concentration of the different material M2. Note that the shape of the infiltration portion 33 illustrated in FIG. 1 is just an example of a schematic illustration.

The vicinity outside the boundary portion between the base material portion 20 and the different material portion 30 includes two minute projections 41 indicating a boundary of a cavity 140 closed in a frame-like core 113 to be described later. The boundary portion between the base material portion 20 and the different material portion 30 is located between the two projections 41. One of the projections 41 is formed on an upper surface of the base material portion 20 and the other one of the projections 41 is formed on an upper surface of the different material portion 30. Note that the boundary portion between the base material portion 20 and the different material portion 30 is located closer to the side of the base material portion 20 than a middle position of the projections 41.

As illustrated in FIG. 1, the installment panel 10 includes a plurality of through-holes 32 formed in a portion closer to the side of the different material portion 30 than the infiltration portion 33, namely, a portion close to the boundary portion of the different material portion 30. The plurality of through-holes 32 are formed so as to surround the fragile portion 31.

Figure 3:
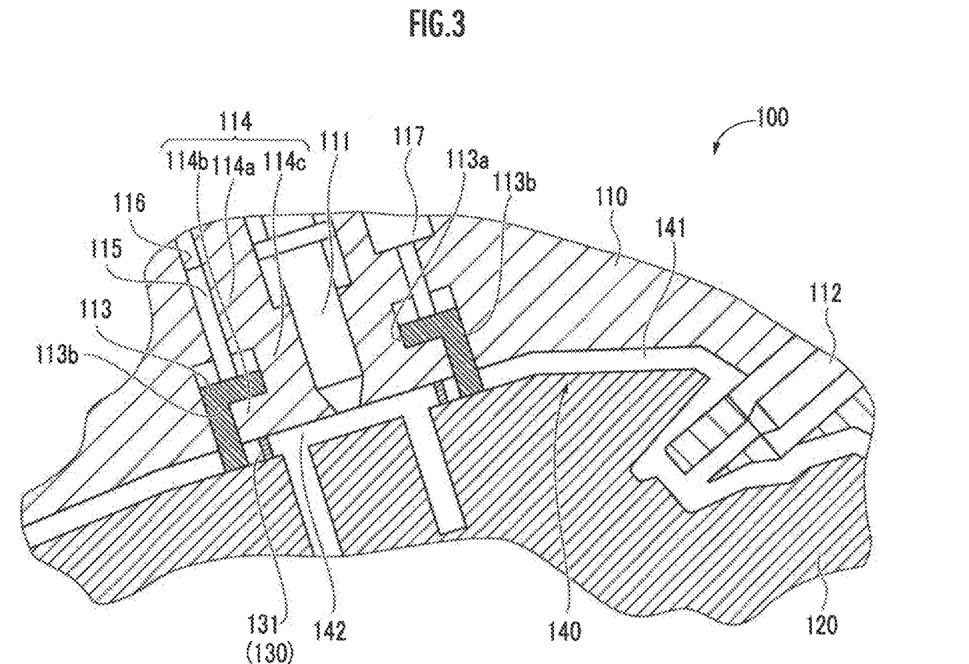
FIG. 3 is a schematic cross sectional view of an injection mold of a molding device of the instrument panel according to the embodiment of the present invention, illustrating a state in which a frame-like core is placed in a separated position.

Here, as illustrated in FIG. 3, each through-hole 32 has a V shape in a top view and is overlapped with each other such that a connecting point of two sides of a V shape of another through-hole 32, namely, a V-shaped projecting point is located in an area surrounded on three sides connecting the three end points of the V shape.

More specifically, each through-hole 32 is disposed continuously in a row with the V shape being overlapped with each other in parallel with the longitudinal direction of the boundary portion between the base material portion 20 and the different material portion 30. As an example, assuming that the base material portion 20 and the different material portion 30 each have a thickness of 3.5 mm, and the different material portion 30 has a long side of 290 mm and a short side of 190 mm in top view, the V shape of each through-hole 32 has, for example, a line width of 1.0 mm, an angle of 30 degrees, one side with a length of 25 mm, and an interval of 8 mm between the adjacent V-shaped sides.

Note that the shape of the through-hole 32 is not limited to the V shape. The shape of the through-hole 32 preferably has at least a bent portion such as a U shape, a W shape, and a wave shape. Note that the shape of the through-hole 32 may not have a bent portion, and may be linear, circular, elliptical, or the like. Note also that the shape of the through-hole 32 may have a plurality of mixed shapes.

Note also that the adjacent through-holes 32 preferably are overlapped with each other, but the present invention is not limited to this. Only a part of the plurality of through-holes 32 may be overlapped with each other.

Further, the plurality of through-holes 32 preferably are disposed continuously in a row in parallel with the longitudinal direction of the boundary portion between the base material portion 20 and the different material portion 30, but the present invention is not limited to this. For example, the plurality of through-holes 32 may be disposed in a plurality of rows, in a staggered manner, randomly, or sparsely.

Further, each through-hole 32 may have a different cross-sectional shape in the thickness direction. The through-hole 32 abuts against an inner wall surface facing in the thickness direction and the gap may disappear.

Further, instead of the through-hole 32, a hole having a bottom (bottomed hole, groove) may be provided. The bottomed hole may have various shapes as described above on the through-hole 32.

Note that the bottomed hole preferably has an opening in the back surface of the different material portion 30. This configuration can hide the opening of the bottomed hole from the front surface which is a design surface of the instrument panel 10, thereby to improve visual quality such as external appearance.

Then, the description will focus on an injection mold 100 constituting a molding device of an instrument panel for use in molding the instrument panel 10.

As illustrated in FIG. 3, the injection mold 100 comprises an upper mold 110, a lower mold 120, and a core 130. Mold clamping is performed by relatively moving the lower mold 120 closer to the upper mold 110. Mold opening is performed by relatively separating the lower mold 120 from the upper mold 110.

A cavity 140 in which the instrument panel 10 is molded is formed by performing mold clamping by the upper mold 110 and the lower mold 120. The cavity 140 comprises a base material portion molding portion 141 and a different material portion molding portion 142. Note that the base material portion molding portion 141 corresponds the first resin portion molding portion of the present invention and the different material portion molding portion 142 corresponds the second resin portion molding portion of the present invention respectively.

The upper mold 110 comprises: a base material supply nozzle 112 which injects the base material M1 into the base material portion molding portion 141; a different material supply nozzle 111 which injects the different material M2 into the different material portion molding portion 142; and a frame-like core 113. Note that the base material supply nozzle 112 corresponds to the first supply nozzle of the present invention and the different material supply nozzle 111 corresponds to the second supply nozzle of the present invention respectively.

The frame-like core 113 is disposed so as to surround the different material supply nozzle 111. The frame-like core 113 has a function of temporarily placing a part of the area of the cavity 140 in a state of being separated from other areas of the cavity 140.

The part of the area of the cavity 140 separated by the frame-like core 113 constitutes the different material portion molding portion 142 in which the different material M2 injected from the different material supply nozzle 111 is filled to mold the different material portion 30. The other area of the cavity 140 other than the part of the area thereof constitutes the base material portion molding portion 141 in which the base material M1 injected from the base material supply nozzle 112 is filled to mold the base material portion 20.

The frame-like core 113 has a function of placing the base material M1 and the different material M2 in a state of being separated from each other so as to prevent the different material M2 filled in an internal area defined by the frame-like core 113 from contacting the base material M1 filled in an external area defined by the frame-like core 113. Note that, although not illustrated, the different material portion molding portion 142 includes a projecting portion for forming the fragile portion 31 in the different material portion 30. The projecting portion is disposed so as to project upward from the lower mold 120.

Figure 4:
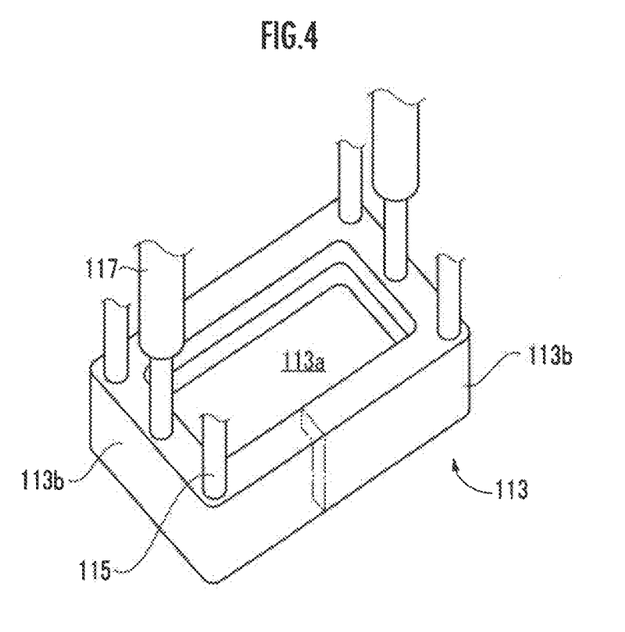
FIG. 4 is a perspective view schematically illustrating the frame-like core and its vicinity.

The frame-like core 113 is movably configured relative to the upper mold 110 in a direction toward the lower mold 120. Here, as illustrated in FIG. 4, the frame-like core 113 is a frame body whose outer frame is substantially rectangular and which has a rectangular through-hole 113a at a center portion thereof. The cross section of a portion corresponding to each side of the outer frame of the frame-like core 113 in the direction from the upper mold 110 to the lower mold 120 has an L shape with the upper mold 110 as the base side as illustrated in FIGS. 3 and 4.

As illustrated in FIG. 3, the upper mold 110 has an injection portion surrounding portion 114 disposed so as to surround a distal end portion of the different material supply nozzle 111. An upper portion 114a and a lower portion 114b of the injection portion surrounding portion 114 are entirely enlarged in a substantially flange-like fashion than a center portion 114c thereof. The center portion 114c of the injection portion surrounding portion 114 has an outer peripheral surface following an inner peripheral surface of a through-hole 113a of the frame-like core 113. The frame-like core 113 is movably configured along the outer peripheral surface.

A lower surface of the lower portion 114b of the injection portion surrounding portion 114 is located facing an upper surface of the lower mold 120 constituting a lower surface of the different material portion molding portion 142 in the cavity 140. The space surrounded by these facing surfaces and an inner wall surface of a side wall 113b of the frame-like core 113 contacting the lower mold 120 constitutes the different material portion molding portion 142 in the cavity 140.

As illustrated in FIG. 4, four corners of an upper surface of the frame-like core 113 have slide guides 115 each having a cylindrical shape and extending upward. Each slide guide 115 is guided through an unillustrated cylindrical hole 116 (see FIG. 3) formed in the upper mold 110 and thereby the frame-like core 113 is movably configured relative to the main body of the upper mold 110.

Further, the distal end portion of each piston of a pair of cylinders 117 fixedly provided to the upper mold 110 is connected to both end portions in the longitudinal direction of an upper end surface of the frame-like core 113. The frame-like core 113 reciprocates relative to the main body of the upper mold 110 by reciprocating operation of the pistons of these cylinders 117. When the piston of the cylinder 117 extends, and the frame-like core 113 moves toward the lower mold 120 and contacts the upper surface of the lower mold 120 as illustrated in FIG. 3, the frame-like core 113 is located in a separated position in which the cavity 140 is placed in a state in which the base material portion molding portion 141 is separated from the different material portion molding portion 142.

Figure 5:
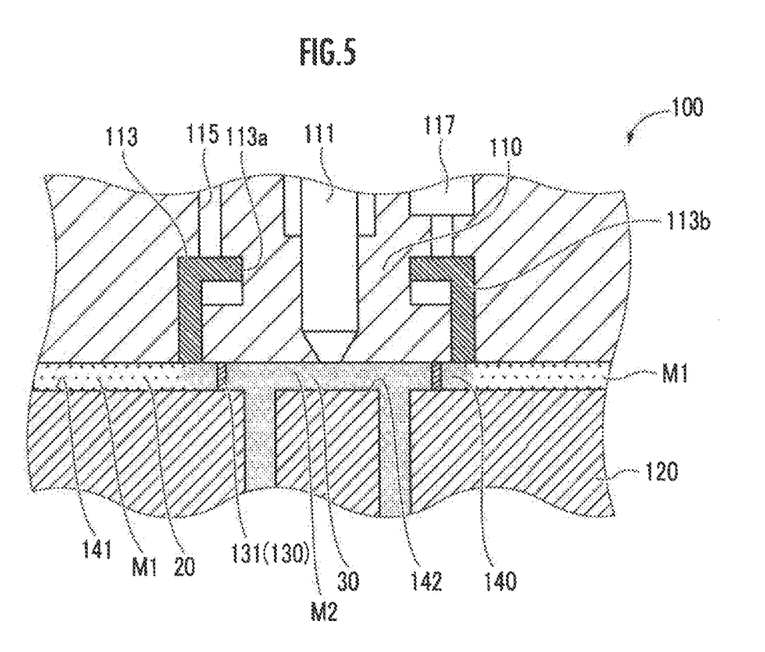
FIG. 5 is a perspective view schematically illustrating the injection mold of the molding device of the instrument panel, illustrating a state in which the frame-like core is placed in an integrated position.

When the pistons of the cylinders 117 shrink and the frame-like core 113 is separated from the lower mold 120 and retracted in the upper mold 110 as illustrated in FIG. 5, the frame-like core 113 is located in an integrated position in which the cavity 140 is placed in a state in which the base material portion molding portion 141 is not separated from the different material portion molding portion 142 and the two portions are integrated. In this manner, the frame-like core 113 can move selectively between the separated position and the integrated position.

The core 130 is a mold for forming the through-hole 32 in the different material portion 30. The core 130 is fixed to the lower mold 120 by a well-known means. Alternatively, the core 130 may be fixed to the upper mold 110 or may be divided into two portions: one being fixed to the upper mold 110 and the other being fixed to the lower mold 120.

In the state in which the frame-like core 113 is located in the separated position, the core 130 is configured such that a plurality of projections 131 surround inside of an inner side of the side wall 113b over the entire circumference. Each projection 131 has a V shape. Assuming that the base material portion 20 and the different material portion 30 each have the above described thickness, the V shape has, for example, a line width of 1.0 mm, an angle of 30 degrees, one side with a length of 25 mm, and an interval of 8 mm between the adjacent V-shaped sides.

The projection 131 of the core 130 is located over the entire circumference in a portion inside an outer peripheral portion of the different material portion molding portion 142 in the cavity 140.

Then, the description will focus on a molding method for the instrument panel 10 according to an embodiment of a molding method for the resin component of the present invention, using the molding device for the instrument panel 10 according to an embodiment of a molding method for the resin component of the present invention.

The molding method for the instrument panel 10 comprises: a cavity separation step S11, a base material filling step S12, a different material filling step S13, a frame-like core opening step S14, a different material pressing step S15, a projection retracting step S16, and a mold opening step S17.

First, the cavity separation step S11 is performed. In the cavity separation step S11, first, the lower mold 120 is moved forward relative to the upper mold 110 for mold clamping to form the cavity 140 as illustrated in FIG. 3. At this time, the frame-like core 113 is located in the separated position, and the cavity 140 is separated into the base material portion molding portion 141 and the different material portion molding portion 142 by the frame-like core 113. At this time, the projection 131 of the core 130 is located over the entire circumference in a portion inside the outer peripheral portion of the different material portion molding portion 142 in the cavity 140.

Then, the base material filling step S12 is performed. In the base material filling step S12, as illustrated in FIG. 5, the base material M1 is injected from the base material supply nozzle 112 to fill the base material portion molding portion 141. Then, a first pressure is applied to the base material M1 in the base material portion molding portion 141 by a pressure at which the base material M1 is injected from the base material supply nozzle 112. The pressure for injecting the base material M1 is controlled by an unillustrated control unit.

Then, the different material filling step S13 is performed. In the different material filling step S13, as illustrated in FIG. 5, the different material M2 is injected from the different material supply nozzle 111 (see FIG. 3) to till the different material portion molding portion 142. Then, a second pressure larger than the first pressure is applied to the different material M2 in the different material portion molding portion 142 by a pressure at which the different material M2 is injected from the different material supply nozzle 111. The pressure for injecting the different material M2 is controlled by an unillustrated control unit.

Then, the frame-like core opening step S14 is performed. In the frame-like core opening step S14, while maintaining the state in which, in the base material filling step S12, the first pressure is applied to the base material M1 and the second pressure is applied to the different material M2, the frame-like core 113 is retracted in the lower mold 120 and the frame-like core 113 is opened to be moved to the integrated position, where the frame-like core 113 is moved from the state in which the base material portion molding portion 141 is separated from the different material portion molding portion 142 to the state in which the two portions are integrated.

The different material pressing step S15 is performed at the same time as the frame-like core opening step S14 is performed. In the different material pressing step S15, while maintaining the state in which the first pressure is applied to the base material M1, the second pressure is continuously applied to the different material M2 at the same time.

Thus, the base material M1 and the different material M2 are infiltrated and spread into the space of the cavity 140 in the portion in which the frame-like core 113 is located. Then, the base material M1 and the different material M2 are contacted and mixed with each other. The portion of the base material M1 and the different material M2 contacting the upper mold 110 or the lower mold 120 has a large heat dissipation and thus is more quickly solidified than the portion inside thereof.

For this reason, in the central portion where solidification is slow, the different material M2 to which a large second pressure is applied pushes aside the base material M1 to which only the first pressure smaller than the second pressure is applied and has not been solidified, and is infiltrated into the base material M1 so as to protrude toward the center thereof. At this time, the flow amount of the different material M2 flowing outward by the core 130 varies depending on the position. Therefore, the infiltration portion 33 in which the different material M2 is infiltrated into the base material M1 is broken at many places to form a so-called a petal shape.

Note that FIG. 1 schematically illustrates the infiltration portion 33 such that the darker the color, the higher the percentage of the different material M2. Note also that FIG. 1 illustrates that each infiltration portion 33 has the same size and shape, but actually the size and shape of the infiltration portion 33 are different depending on the portion. In some cases, the distal end of the infiltration portion 33 may be curved or linear over one side of the different material portion 30.

Then, the base material M1 and the different material M2 are cooled and solidified in the state in which the different material M2 is infiltrated into the base material M1 in a portion where the distal end portion of the frame-like core 113 is retracted.

Then, the mold opening step S17 is performed. In the mold opening step S17, the lower mold 120 is retracted relative to the upper mold 110 to perform mold opening. Then, the instrument panel 10 including the base material portion 20 and the different material portion 30 is removed from the injection mold 100.

Note that the different material portion molding portion 142 includes an unillustrated projecting portion for forming the fragile portion 31 in the different material portion 30. The projecting portion projects from the lower mold 120 toward inside the different material portion molding portion 142 and thus forms the fragile portion 31 in the different material portion 30.

Further, the projections 131 of the core 130 are located over the entire circumference in a portion inside the outer peripheral portion of the different material portion molding portion 142 in the cavity 140. Thus, by these projections 131, a plurality of through-holes following the external shape of the projections 131 are formed in the different material portion 30.

After removed from the injection mold 100, the instrument panel 10 is further cooled. At this time, the shape of the instrument panel 10 is not defined by the injection mold 100.

Since the thermal shrinkage ratio of the different material M2 is larger than the thermal shrinkage ratio of the base material M1, the extent to which the different material portion 30 shrinks by cooling after being removed from the injection mold 100 is larger than the extent to which the base material portion 20 shrinks. Since the different material portion 30 is surrounded by the base material portion 20, it is difficult to eliminate the shrinkage difference. Therefore, if the plurality of through-holes do not exist, the shrinkage difference may cause deformation such as distortion to occur in the vicinity of the boundary portion between the base material portion 20 and the different material portion 30.

In the present embodiment, in the boundary portion between the base material portion 20 and the different material portion 30, the infiltration portion 33 in which the different material M2 is infiltrated into the base material M1 is broken at many places to form a so-called a petal shape. Thus, the bonding strength between the base material portion 20 and the different material portion 30 can be improved.

Note that the plurality of through-holes are formed inside the boundary portion between the base material portion 20 and the different material portion 30. Thus, when the base material portion 20 and the different material portion 30 shrink with the cooling, the shrinkage difference of these can be absorbed by deforming so as to collapse each through hole. Thus, the outer appearance of the instrument panel 10 can be improved. The above described through-holes 32 of the different material portion 30 are formed by collapsing and deforming the through-holes of the different material portion 30 before cooling.

Further, the through-holes of the different material portion 30 are continuously formed overlapped with each other, which can effectively absorb deformation. Thus, the outer appearance of the instrument panel 10 can be further improved. Furthermore, each through-hole of the different material portion 30 has a V shape and, a result of experiments by the inventors, the inventors have found that the V shape effectively absorbs the deformation as compared with other shapes such as linear and circular shapes.

Further, the base material portion 20 and the different material portion 30 can be integrally molded by the cavity 140 formed by one injection mold 100. This can eliminate the need for a step to preliminarily mold the different material portion 30 using a separate injection mold, which allows the instrument panel 10 to be molded with less number of steps and with higher working efficiency.

Further, the frame-like core 113 is used to define the different material portion molding portion 142 in the cavity 140, which can prevent the different material M2 from excessively flowing in the cavity 140 and thus can prevent the different material M2 from being excessively consumed.

Further, after the base material portion molding portion 141 is filled with the base material M1 and the different material portion molding portion 142 is filled with the different material M2, the frame-like core 113 is retracted to interconnect the base material portion molding portion 141 and the different material portion molding portion 142, whereby the different material M2 can be infiltrated into the base material M1, which can firmly bond the base material portion 20 and the different material portion 30. Furthermore, this configuration can absorb shrinkage due to the difference in thermal shrinkage ratio between the base material M1 and the different material M2 in the boundary portion between the base material portion 20 and the different material portion 30 and can prevent deformation such as distortion at and after the mold opening, which occurs due to the difference in thermal shrinkage ratio between the base material M1 and the different material M2.

The present invention is not limited to the above described embodiments. For example, the infiltration portion 33 has been described about a case where the different material portion 30 is infiltrated toward the base material portion 20. However, the infiltration portion 33 may be formed such that the base material portion 20 is infiltrated toward the different material portion 30.

So far, the description has been given to a case where a plurality of V-shaped projections 131 are formed in the core 130, and after cooling, a plurality of V-shaped through-hole 32 are formed in the different material portion 30. However, the projection 131 formed in the core 130 is not limited to this, but may be a shape capable of forming a shape of the through-hole 32 in the different material portion 30 as described above.

Further, the discontinuous portion formed in the different material portion 30 is not limited to the through-hole 32 or a bottomed hole. For example, the discontinuous portion may be formed by contacting the side wall portions of the through hole or the bottomed hole or further may be a notch.

Further, as described above, instead of the through-hole 32, the bottomed hole may be formed in the different material portion 30. In this case, the projection formed in the core 130 may have a gap between the projection and the lower surface of the upper mold 110 or the upper surface of the lower mold 120 in the mold clamping state.

So far, the description has been given to a case where the thermal shrinkage ratio of the different material M2 is larger than the thermal shrinkage ratio of the base material M1. However, the present invention is not limited to this. For example, the thermal shrinkage ratio of the different material M2 may be smaller than the thermal shrinkage ratio of the base material M1. In this case, when the base material portion 20 and the different material portion 30 shrink with the cooling, the shrinkage difference of these can be absorbed by deforming so as to spread a discontinuous portion such as a through-hole. Further, the base material M1 and the different material M2 may have the same thermal shrinkage ratio and the resin material may be different only in color or the like.

So far, the description has been given to a case where the base material portion 20 is bonded to the different material portion 30 such that the base material portion 20 surrounds the different material portion 30 over the entire circumference. However, the present invention is not limited to this. For example, the two portions may be bonded such that the base material portion 20 surrounds at least part of the different material portion 30. In this case, the area portion in which the different material portion 30 is surrounded by the base material portion 20 is bound by the base material portion 20, but the shrinkage difference occurring at cooling can be absorbed by the discontinuous portion.

Further, the present invention may be applied to a case where the base material portion 20 and the different material portion 30 are bonded at least one side thereof. In this case, at one side bonded, the different material portion 30 is also bound by the base material portion 20, and a shrinkage difference occurs along the side at cooling, but this shrinkage difference can be absorbed by the discontinuous portion.

So far, the description has been given to a case where the resin component is the instrument panel 10. However, the resin product according to the present invention is not limited to the installment panel 10, but may be any product as long as the base material portion made of the base material M1 is bonded to the different material portion made of the different material M2.

REFERENCE SIGNS LIST 10 instrument panel (resin component)
20 base material portion (first resin portion)
30 different material portion (second resin portion)
31 fragile portion
32 through-hole (discontinuous portion)
33 infiltration portion
41 projection
100 injection mold
110 upper mold
111 different material supply nozzle (second supply nozzle)
112 base material supply nozzle (first supply nozzle)
113 frame-like core
120 lower mold
131 projection
130 core
140 cavity
141 base material portion molding portion (first resin portion molding portion)
142 different material portion molding portion (second resin portion molding portion)
M1 base material (first resin material)
M2 different material (second resin material)

The invention claimed is:

1. A resin component formed by bonding a first resin portion composed of a first resin material and a second resin portion composed of a second resin material, wherein
one of the first resin portion and the second resin portion is infiltrated into the other, and an infiltration portion has a plurality of intermittent recessed portions,
a plurality of projections are formed at a boundary portion between the first resin portion and the second resin portion, the plurality of projections being arranged along an infiltration direction of the infiltration portion, and
the plurality of intermittent recessed portions are disposed between the plurality of projections.

2. The resin component according to claim 1, wherein the plurality of intermittent recessed portions are arranged in the infiltration portion along a direction orthogonal to an infiltration direction.

3. A molding method for a resin component formed by bonding a first resin portion composed of a first resin material and a second resin portion composed of a second resin material, the method comprising:
supplying the first resin material to a first mold portion in which the first resin portion of the resin component is molded, and supplying the second resin material to a second mold portion in which the second resin portion of the resin component is molded at a supply pressure different from a supply pressure of the first resin material, for a cavity having a plurality of projection portions disposed at a boundary portion between the first mold portion and the second mold portion,
wherein, at the boundary portion, the first resin material and the second resin material flow at a same time, and the first resin material and the second resin material are supplied so that the plurality of projection portions disposed at the cavity causes a flow amount of the first resin material or the second resin material to vary at each projection portion.

4. A molding device of a resin component formed by bonding a first resin portion composed of a first resin material and a second resin portion composed of a second resin material, the molding device comprising:
a cavity having a plurality of projection portions disposed at a boundary portion between a first mold portion in which the first resin portion of the resin component is molded and a second mold portion in which the second resin portion of the resin component is molded;
a first supply nozzle which supplies the first mold portion with the first resin material;
a second supply nozzle which supplies the second mold portion with the second resin material; and
a control unit configured to supply the second resin material at a supply pressure different from a supply pressure of the first resin material,
wherein the plurality of projection portions are disposed at the boundary portion so that a flow amount of the first resin material or the second resin material varies at each projection portion.

5. The molding method for a resin component according to claim 3, wherein a slide core which separates the first mold portion and the second mold portion is provided at the boundary portion, and
the first mold portion and the second mold portion are communicated by sliding the slide core, and the first resin material and the second resin material are flown at the same time at the boundary portion.

6. The molding device of a resin component according to claim 4, wherein a slide core is slidably provided at the boundary portion, the slide core slides to communicate the first mold portion and the second mold portion.

7. The molding device of a resin component according to claim 4, wherein the plurality of projection portions are disposed closer to the second mold portion from a center of the boundary portion, and
the control unit is configured to supply the second resin material at the supply pressure larger than the supply pressure of the first resin material.

* * * * *